United States Patent [19]

Hirata et al.

[11] Patent Number: 4,832,082

[45] Date of Patent: May 23, 1989

[54] HYDRAULIC PILOT OPERATED DIRECTIONAL CONTROL VALVE

[75] Inventors: Toichi Hirata, Ushiku; Hideaki Tanaka, Ibaraki; Genroku Sugiyama, Ibaraki; Shinichi Satoh, Ibaraki, all of Japan

[73] Assignee: Hitachi Construction Machinery Co., Ltd., Tokyo, Japan

[21] Appl. No.: 196,011

[22] PCT Filed: Aug. 27, 1987

[86] PCT No.: PCT/JP87/00635

§ 371 Date: Apr. 22, 1988

§ 102(e) Date: Apr. 22, 1988

[87] PCT Pub. No.: WO88/01706

PCT Pub. Date: Mar. 10, 1988

[30] Foreign Application Priority Data

Sep. 1, 1986 [JP] Japan .................................. 61-132766

[51] Int. Cl.[4] .................... F15B 13/042; F16K 31/122

[52] U.S. Cl. .................................... 137/625.66; 92/79; 251/63

[58] Field of Search .............................. 92/79; 138/42; 137/625.66; 251/63

[56] References Cited

U.S. PATENT DOCUMENTS 2,568,123 9/1951 Goldberg .......................... 138/42 X

FOREIGN PATENT DOCUMENTS 51-54418 12/1976 Japan .

*Primary Examiner*—Gerald A. Michalsky

*Attorney, Agent, or Firm*—Antonelli, Terry & Wands

[57] ABSTRACT

A hydraulic pilot operated directional control valve (30; 60; 70) in which at least one pilot hydraulic pressure chamber (40, 41; 76) is formed within a block (39; 64; 75) of a hydraulic pilot operating section (32, 33; 61; 72), and pilot hydraulic fluid is led into the pilot hydraulic pressure chamber to drive a spool (37, 38; 74). A drain passageway (54; 82) is provided in the vicinity of the pilot hydraulic pressure chamber (40, 41; 76) within the block (39; 64; 75), and the pilot hydraulic pressure chamber and the drain passageway communicate with each other through minute passageway means (52, 53; 83) for bleeding air.

1 Claim, 3 Drawing Sheets

HYDRAULIC PILOT OPERATED DIRECTIONAL CONTROL VALVE

TECHNICAL FIELD

The present invention relates to hydraulic pilot operated directional control valves and, in particular, to a hydraulic pilot operated directional control valve which is controlled in a manner switched in response to a pilot pressure, for controlling flow of hydraulic fluid supplied to hydraulic actuators in hydraulic machines such as a hydraulic excavator and the like.

BACKGROUND ART

Hitherto, a hydraulic pilot operated directional control valve has widely been used to control flow of hydraulic fluid supplied to hydraulic actuators in a hydraulic machine such as a hydraulic excavator or the like, to control motion of the hydraulic actuators.

FIG. 1 shows a hydraulic circuit having incorporated therein such hydraulic pilot operated directional control valve. In the figure, the reference numeral 1 denotes the hydraulic pilot operated directional control valve which is composed of a valve body section 2 and hydraulic pilot operating sections 3 and 4. The valve body section 2 is connected to a hydraulic pressure source 5 and a reservoir 6, and is connected to a hydraulic actuator 7, for controlling flow of hydraulic fluid supplied from the hydraulic pressure source 5 to the hydraulic actuator 7. The operating sections 3 and 4 are connected to a pilot valve 10 through respective pilot lines 8 and 9. The pilot valve 10 is adapted to generate a pilot pressure for controlling operation of the valve body section 2. The reference numeral 11 denotes a pilot hydraulic pressure source for the pilot valve 10.

Usually, the directional control valve 1 is formed into a multi-spool valve having accommodated therein a plurality of spools. The directional control valve 1 has connected thereto pilot valves and pilot lines corresponding in number to the spools. FIG. 1, however, shows only the hydraulic actuator 7 and a pilot circuit 8, 9, 10 with respect to one of the valve elements, for convenience of illustration.

As shown in FIG. 2, the directional control valve 1 has a plurality of spools 13 and 14 which are accommodated, for sealing movement, in a block 12 of the valve body section 2. The directional control valve 1 also has a plurality of pilot hydraulic pressure chambers 16 and 17 which are formed in a block 15 of the operating section 3 in a manner corresponding respectively to the plurality of spools 13 and 14.

Various grooves for controlling flow of the hydraulic fluid are formed in outer peripheral surfaces of the respective spools 13 and 14 and in opposed inner peripheral surfaces of the block 12. Of these grooves, FIG. 2 shows only drain grooves 18 through 21. The grooves 20 and 21 in the block 12 are connected to the reservoir 6 so that the hydraulic fluid is returned to the reservoir 6 through the grooves 20 and 21.

The pilot hydraulic pressure chambers 16 and 17 have accommodated respectively therein springs 22 and 23 for applying return forces respectively to the spools 13 and 14. Adapters 26 and 27 having therein respective pilot ports 24 and 25 are mounted to the block 15 through respective threadedly engaging portions 28 and 29. The pilot pressure is introduced into the pilot hydraulic pressure chambers 16 and 17 through the respective pilot ports 24 and 25. The adapter 26 is connected to the pilot valve 10 through the pilot line 8, while he adapter 27 is connected to a pilot line and a pilot valve which are not shown.

Although not shown, the hydraulic pilot operating section 4 is constructed in a manner similar to the operating section 3.

In this hydraulic pilot operated directional control valve 1, as the pilot valve 10 is operated, the pilot pressure is led from the pilot port 24 of the adapter 26 into the pilot hydraulic pressure chamber 16 through one of the pilot lines 8 and 9, for example, the pilot line 8, depending upon the direction in which the pilot valve 10 is operated. By this pilot pressure, the spool 13 is moved downwardly as viewed in the figure, to cause the hydraulic fluid from the hydraulic pressure source 5 to be supplied to the hydraulic actuator 7 through a plurality of grooves, not shown, formed in the spool 13 and the block 12, thereby driving the actuator 7. The returning hydraulic fluid from the hydraulic actuator 7 is returned to the reservoir 6 through the grooves 18 and 20.

By the way, in the hydraulic pilot operated directional control valve 1 constructed in this manner, air mingled in the pilot hydraulic fluid might be accumulated within the pilot hydraulic pressure chambers 16 and 17. If air is accumulated within the pilot hydraulic pressure chambers 16 and 17, switching speed, that is, responsibility of the hydraulic pilot operated directional control valve 1 with respect to the pilot pressure is deteriorated. Accordingly, in such case, so-called air bleeding is carried out in such a manner that the adapters 26 and 27 are detached from the block 15 to release air within the pilot hydraulic pressure chambers 16 and 17 to the outside.

However, operation of manually attaching and detaching the adapters 26 and 27 is considerably troublesome. In particular, it has taken time to remove oil adhering to the adapters 26 and 27 and the like. Moreover, even if the air bleeding has once been carried out, similar air bleeding has again been required to be effected after the elapse of a predetermined period of time, thus involving the maintenance cost.

It is therefore an object of the invention to provide a hydraulic pilot operated directional control valve in which release of air accumulated within a pilot hydraulic pressure chamber to the outside can be carried out automatically without the need of manual operation.

DISCLOSURE OF THE INVENTION

In a hydraulic pilot operated directional control valve in which at least one pilot chamber is formed within a block of a hydraulic pilot operating section, and pilot hydraulic fluid is introduced into the pilot chamber to drive a spool, the hydraulic pilot operated directional control valve of the invention is characterized in that a drain passageway is provided in the vicinity of the pilot hydraulic pressure chamber within said block, and the pilot hydraulic pressure chamber and the drain passageway communicate with each other through minute passageway means for bleeding air.

With such arrangement, air accumulated within the pilot hydraulic pressure chamber is released into a reservoir through the minute passageway means and the drain passageway, so that air bleeding is automatically carried out.

BEST MODE FOR CARRYING OUT THE INVENTION

Embodiments of the invention will be described below with reference to FIGS. 3 through 6.

Figure 1:
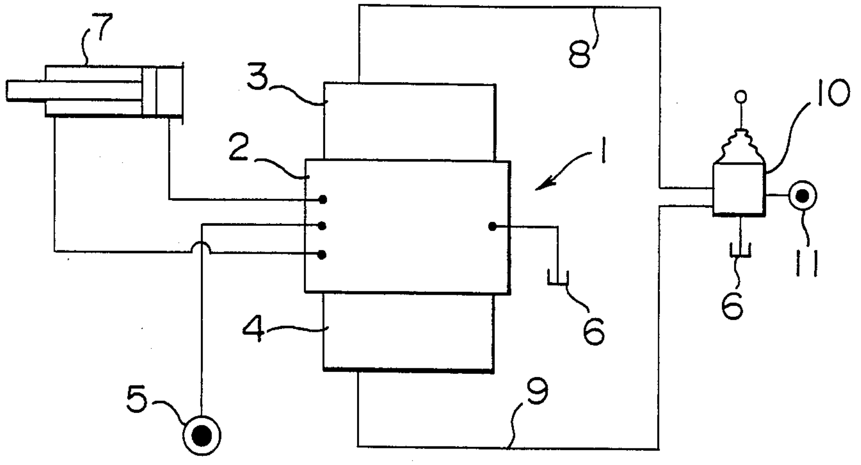
FIG. 1 PRIOR ART
FIG. 1 is a circuit diagram showing a hydraulic circuit in which a conventional hydraulic pilot operated directional control valve is incorporated.
Figure 2:
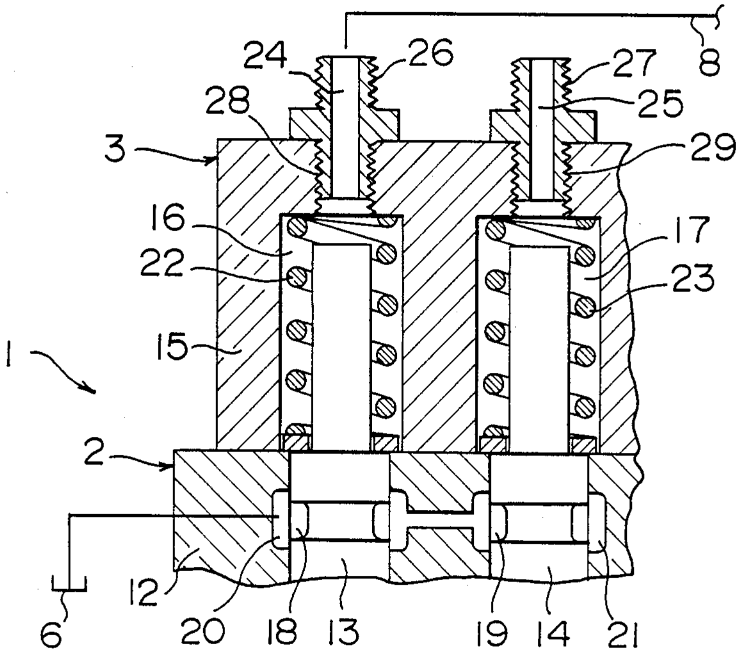
FIG. 2 PRIOR ART
FIG. 2 is a cross-sectional view of a principal portion of the hydraulic pilot operated directional control valve.
Figure 3:
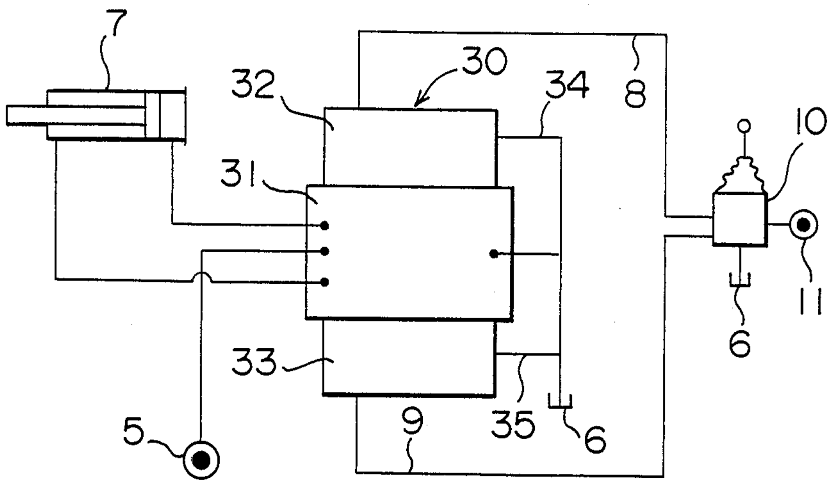
FIG. 3 is a circuit diagram showing a hydraulic circuit in which a hydraulic pilot operated directional control valve according to an embodiment of the invention is incorporated.

In FIG. 3, the reference numeral 30 denotes a hydraulic pilot operated directional control valve according to an embodiment of the invention. The control valve 30 is composed of a valve body section 31 and hydraulic pilot operating sections 32 and 33. In FIG. 3, like reference numerals are used to designate component parts like those illustrated in FIG. 1. That is, the valve body section 31 is connected to a hydraulic pressure source 5 and a reservoir 6, and is connected to a hydraulic actuator 7, for controlling flow of hydraulic fluid supplied from the hydraulic pressure source 5 to the hydraulic actuator 7. The operating sections 32 and 33 are connected to a pilot valve 10 through respective pilot lines 8 and 9. The pilot valve 10 is adapted to generate pilot pressure for controlling operation of the valve body section 31. The operating sections 32 and 33 are also connected to the reservoir 6 through respective drain lines 34 and 35 for the purposes subsequently to be described. the reference numeral 11 denotes a pilot hydraulic pressure source for the pilot valve 10.

The directional control valve 30 is preferably formed into a multi-spool valve having accommodated therein a plurality of spools. The directional control valve 30 has connected thereto pilot valves and pilot lines corresponding in number to the spools. FIG. 3, however, shows only the hydraulic actuator 7 and a pilot circuit 8, 9, 10 with respect to one of the valve elements, for convenience of illustration.

Figure 4:
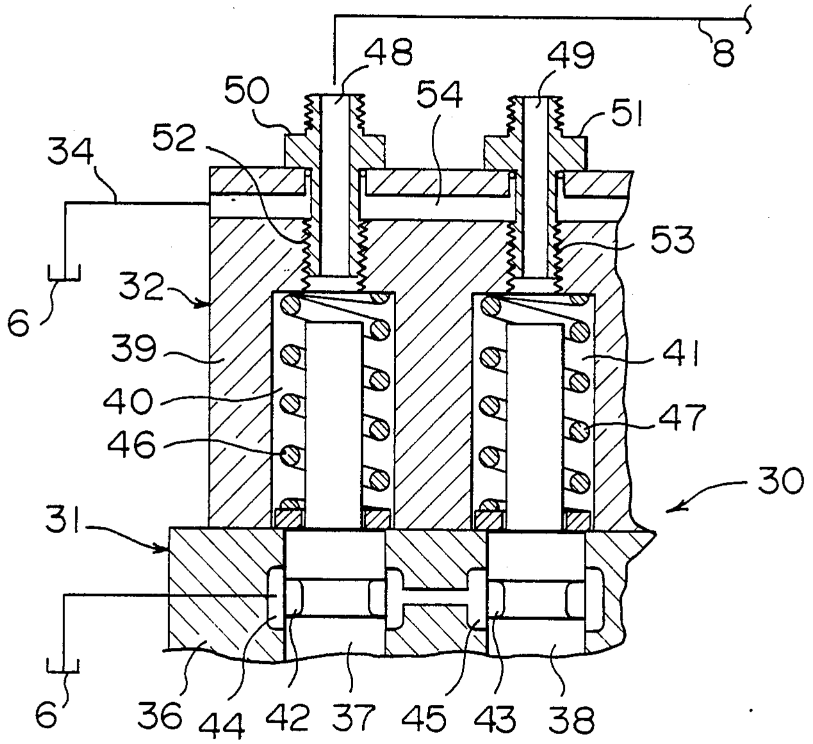
FIG. 4 is a cross-sectional view of a principal portion of the hydraulic pilot operated directional control valve.

As shown in FIG. 4, the directional control valve 30 has a plurality of spools 37 and 38 which are accommodated, for sealing movement, within a block 36 of the valve body section 31. The directional control valve 30 also has a plurality of pilot hydraulic pressure chambers 40 and 41 formed within a block 39 of the operating section 32 in a manner corresponding respectively to the plurality of spools 37 and 38.

Various grooves for controlling flow of the hydraulic fluid are formed in outer peripheral surfaces of the respective spools 37 and 38 and in opposed inner peripheral surfaces of the block 36. Of the grooves, FIG. 4 shows only drain grooves 42 through 45. The grooves 44 and 45 in the block 36 are connected to the reservoir 6 so that the hydraulic fluid is returned to the reservoir 6 through the grooves 44 and 45.

Accommodated respectively in the pilot hydraulic pressure chambers 40 and 41 are springs 46 and 47 for applying return forces respectively to the spools 37 and 38. Adapters 50 and 51 having therein respective pilot ports 48 and 49 are mounted to the block 39. The pilot pressure is introduced into the pilot hydraulic pressure chambers 40 and 41 through the respective pilot ports 48 and 49. The adapters 50 and 51 are detachably mounted to the block 39 through respective threadedly engaging portions 52 and 53 which are constituted respectively by threaded engagement of male threads formed on the adapters with female threads formed in the block 39.

A drain passageway 54 independent of the drain grooves 44 and 45 formed in the block 36 of the valve body section 31 is provided in the vicinity of the pilot hydraulic pressure chambers 40 and 41 within the block 39. The drain passageway 54 is connected to the reservoir 6 through the above-mentioned drain line 34.

The aforesaid threadedly engaging portions 52 and 53 are located from the respective pilot hydraulic pressure chambers 40 and 41 to the drain passageway 54. The pilot hydraulic pressure chambers 40 and 41 communicate with the drain passageway 54 through respective gaps at the threadedly engaging portions 52 and 53. The gaps at the respective threadedly engaging portions 52 and 53 have their respective cross-sectional flow passage areas of the order that enables passage of air, but almost prevents passage of the pilot hydraulic fluid. Thus, the gaps constitute minute passageway means for bleeding air.

Although not shown, the operating section 33 is likewise constructed.

In the embodiment constructed in this manner, air accumulated within the pilot hydraulic pressure chambers 40 and 41 is led to the drain passageway 54 through the gaps at the respective threadedly engaging portions 52 and 53, and is released to the reservoir 6 through the drain line 34. In this connection, since the drain passageway 54 is provided independently of the drain grooves 44 and 45 in the valve body section 31, bleeding of air is effected excellently without being influenced by the pressure of the hydraulic fluid in the grooves. This makes it possible to effect air bleeding automatically without carrying out attaching and detaching of the adapters 48 and 49. Thus, no special working is required for the air bleeding, making it possible to reduce the maintenance cost.

Additionally, the inventors of this application ascertained the following fact. That is, the pilot hydraulic fluid within the pilot hydraulic pressure chambers 40 and 41 also flowed out into the drain passageway 54 through the gaps at the respective threadedly engaging portions 52 and 53, depending upon the manufacturing accuracy of the threads at the threadedly engaging portions 52 and 53. However, in case of the hydraulic fluid high in viscosity as compared with air, an outflow amount of the hydraulic fluid was extremely slight, for example, of the order of several tens cc/min. The amount of such order did not substantially influence usual moving action of the spools 37 and 38.

Figure 5:
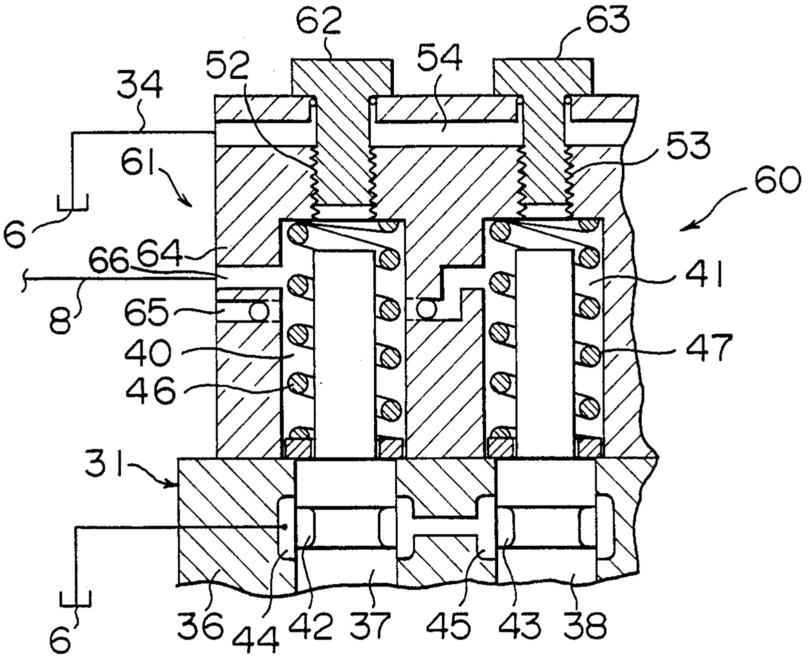
FIG. 5 is a cross-sectional view of a principal portion of a hydraulic pilot operated directional control valve according to another embodiment of the invention.

FIG. 5 shows a hydraulic pilot operated directional control valve according to another embodiment of the invention. In the figure, like reference numerals are used to designate component parts like those illustrated in FIG. 4. The hydraulic pilot operated directional control valve is generally designated by the reference numeral 60.

In this control valve 60, plugs 62 and 63 are provided in a hydraulic pilot operating section 61, in substitution for the adapters 48 and 49 of the embodiment illustrated in FIG. 4. Like the adapters 48, 49, the plugs 62 and 63 are detachably mounted to a block 64 through respective threadedly engaging portions 52 and 53 which are formed respectively by threaded engagement of male threads provided on the plugs 62 and 63 with female threads provided in the block 64. The embodiment is similar to the first embodiment in that gaps at the respective threadedly engaging portions 52 and 53 constitute air-bleeding minute passageway means for bringing the pilot hydraulic pressure chambers 40 and 41 into communication with the drain passageway 54.

On the other hand, the block 64 is formed therein with pilot ports 65 and 66 through which the pilot pressure is introduced into the pilot hydraulic pressure chambers 40 and 41. The pilot port 66 is connected to the pilot line 8, while the pilot port 65 is connected to a pilot line which is not shown.

Although not shown, the other hydraulic pilot operating section of the control valve 60 is likewise constructed.

Like the above-mentioned first embodiment, it is possible also for the embodiment constructed in this manner to release air accumulated within the pilot hydraulic pressure chambers 40 and 41 from the gaps at the respective threadedly engaging portions 52 and 53 to the reservoir 6 through the drain passageway 54 and the drain line 34, thereby automatically carrying out air bleeding.

Figure 6:
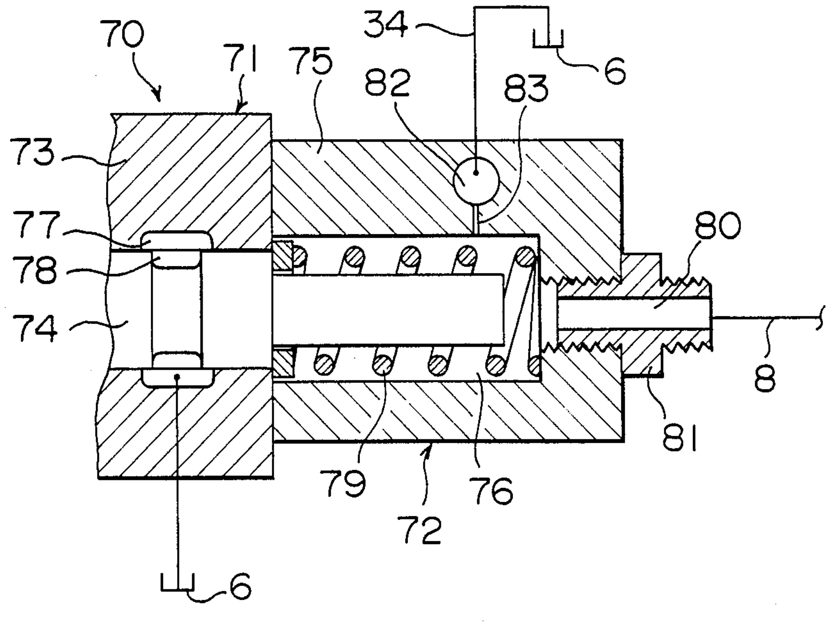
FIG. 6 is a cross-sectional view of a principal portion of a hydraulic pilot operated directional control valve according to still another embodiment of the invention.

FIG. 6 shows a hydraulic pilot operated directional control valve 70 according to still another embodiment of the invention. The control valve 70 also has a valve body section 71 and opposed hydraulic pilot operating sections 72 (only one shown). However, the control valve 70 is so arranged as to offer a single control valve in which a single spool 74 is accommodated in a block 73 of the valve body section 71, and a single pilot hydraulic pressure chamber 76 is correspondingly formed within a block 75 of the hydraulic pilot operating section 72. The block 73 of the valve body section 71 and the spool 74 are formed with various grooves including drain grooves 77 and 78. A spring 79 is accommodated in the pilot hydraulic pressure chamber 76. An adapter 81 offering a pilot port 80 is mounted to the block 75 of the operating section 72, so that the pilot pressure is introduced from the pilot line 8 into the pilot hydraulic pressure chamber 76 through the pilot port 80.

A drain passageway 82 is formed in the vicinity of the pilot hydraulic pressure chamber 76 within the block 75. Like the above-mentioned embodiment, the drain passageway 82 is connected to the reservoir 6 through the drain line 34. Formed between the pilot hydraulic pressure chamber 76 and the drain passageway 82 is a fine bore 83 serving as minute passageway means for bleeding air The fine bore 83 has a cross-sectional flow passage area of the order that enables passage of air, but almost prevents passage of the pilot hydraulic fluid.

It is possible also for the embodiment constructed in this manner to release air accumulated within the pilot hydraulic pressure chamber 76 to the reservoir 6 through the fine bore 83, the drain passageway 82 and the drain line 34, thereby likewise carrying out air bleeding automatically.

As will be clear from the foregoing, according to the hydraulic pilot operated directional control valve of the invention, release of air accumulated within the pilot hydraulic pressure chamber or chambers to the outside can be effected automatically. Thus, the manual operation required for air bleeding of this kind, which has conventionally been carried out, can be dispensed with, thereby making it possible to reduce the maintenance cost involved in this operation.

What is claimed is:

1. A hydraulic pilot operated directional control valve comprising:

at least one pilot hydraulic pressure chamber formed within a block of a hydraulic pilot operating section of the valve, a drain passageway provided in the vicinity of said pilot hydraulic pressure chamber within said block, an adapter for connecting a pilot line to said pilot hydraulic pressure chamber, said adapter being threadedly attached on said block, and an air bleeding means for bleeding air in said pilot hydraulic pressure chamber to said drain passageway, said air bleeding means including a gap formed in a threadedly engaging portion of said adapter and block extending between said pilot hydraulic pressure chamber and drain passageway.

* * * * *